US009606944B2

(12) United States Patent
Cordero et al.

(10) Patent No.: US 9,606,944 B2
(45) Date of Patent: Mar. 28, 2017

(54) SYSTEM AND METHOD FOR COMPUTER MEMORY WITH LINKED PATHS

(71) Applicant: International Business Machines Corporation, Armonk, NY (US)

(72) Inventors: Edgar R. Cordero, Round Rock, TX (US); Girisankar Paulraj, Bangalore (IN); Diyanesh B. Chinnakkonda Vidyapoornachary, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 14/220,617

(22) Filed: Mar. 20, 2014

(65) Prior Publication Data

US 2015/0269096 A1    Sep. 24, 2015

(51) Int. Cl.
G06F 13/36 (2006.01)
G06F 13/00 (2006.01)
G06F 13/28 (2006.01)
G06F 1/00 (2006.01)
G06F 13/16 (2006.01)
G06F 12/02 (2006.01)
G06F 3/06 (2006.01)

(52) U.S. Cl.
CPC ...... *G06F 13/1673* (2013.01); *G06F 12/0246* (2013.01); *G06F 3/065* (2013.01); *G06F 2212/7203* (2013.01); *G06F 2212/7208* (2013.01)

(58) Field of Classification Search
CPC ..... G11C 7/10; G11C 5/04; G11C 2207/2227; G06F 1/3275; G06F 1/3287; G06F 13/1694; G06F 11/2094

USPC .......... 710/308, 310; 326/30; 711/105, 162; 713/300, 323
See application file for complete search history.

(56) References Cited

U.S. PATENT DOCUMENTS 4,783,731 A    11/1988    Miyazaki et al.
5,060,185 A    10/1991    Naito et al.
(Continued)

FOREIGN PATENT DOCUMENTS

WO    2008068176 A1    6/2008

OTHER PUBLICATIONS

Intel, "Intel® E7221 Chipset," Datasheet, Sep. 2004, Reference No. 303630-001, http://www.intel.com/content/www/us/en/chipsets/e7221-chipset-datasheet.html.

*Primary Examiner* — Faisal M Zaman
(74) *Attorney, Agent, or Firm* — Scott S. Dobson

(57) ABSTRACT

A first memory buffer has a first high speed memory channel and a second high speed memory channel. A second memory buffer is connected to the first memory buffer through a first connection. The second memory buffer has a third high speed memory channel and a fourth high speed memory channel. The first connection connects the first high speed memory channel and the third high speed memory channel. A first memory controller is connected to the first memory buffer through the second high speed memory channel. A second memory controller is connected to the second memory buffer through a second connection. The second connection is connected to the second memory buffer through the fourth high speed memory channel. A first memory module set is connected to the first memory buffer and a second memory module set is connected to the second memory buffer.

8 Claims, 4 Drawing Sheets

(56) References Cited

U.S. PATENT DOCUMENTS

| | | | |
|---|---|---|---|
| 5,134,619 A | 7/1992 | Henson et al. | |
| 5,291,494 A * | 3/1994 | Bruckert | G06F 11/0724 714/24 |
| 5,369,651 A * | 11/1994 | Marisetty | G06F 13/1678 711/113 |
| 5,771,344 A * | 6/1998 | Chan | G06F 11/2082 714/6.32 |
| 6,941,396 B1 | 9/2005 | Thorpe et al. | |
| 7,028,215 B2 | 4/2006 | Depew et al. | |
| 7,447,831 B2 * | 11/2008 | Dreps | G06F 13/1673 711/105 |
| 7,500,070 B2 * | 3/2009 | Schilling | G06F 11/2082 711/135 |
| 7,519,894 B2 * | 4/2009 | Weiβ et al. | G11C 5/04 360/53 |
| 7,584,321 B1 * | 9/2009 | Malachowsky | G06F 13/1684 345/531 |
| 8,261,039 B2 * | 9/2012 | Perego | G11C 7/1075 365/201 |
| 2002/0133740 A1 | 9/2002 | Oldfield et al. | |
| 2003/0221059 A1 * | 11/2003 | Emmot | G06F 11/1666 711/114 |
| 2004/0093472 A1 | 5/2004 | Dahlen et al. | |
| 2004/0158675 A1 | 8/2004 | Hirose | |
| 2005/0033909 A1 * | 2/2005 | Chang | G06F 13/1684 711/105 |
| 2005/0229022 A1 * | 10/2005 | Koishi | G06F 11/2097 714/4.11 |
| 2005/0283523 A1 * | 12/2005 | Almeida | G06F 9/4418 709/211 |
| 2007/0058410 A1 * | 3/2007 | Rajan | G11C 5/02 365/63 |
| 2007/0162670 A1 * | 7/2007 | Yang | G11C 5/04 710/100 |
| 2008/0126816 A1 * | 5/2008 | Prete | G06F 1/3203 713/323 |
| 2008/0140961 A1 | 6/2008 | Atherton et al. | |
| 2009/0150721 A1 | 6/2009 | Kochar et al. | |
| 2009/0300411 A1 * | 12/2009 | Bartley | G06F 11/2092 714/6.12 |
| 2010/0115217 A1 * | 5/2010 | Oh | G06F 11/1044 711/162 |
| 2010/0312963 A1 | 12/2010 | Dekoning et al. | |
| 2011/0047440 A1 | 2/2011 | Blackmon et al. | |
| 2011/0238938 A1 * | 9/2011 | Kloeppner | G06F 3/0611 711/162 |
| 2012/0054518 A1 * | 3/2012 | Sadowski | G06F 1/3203 713/322 |
| 2013/0151767 A1 | 6/2013 | Berke et al. | |
| 2013/0268739 A1 * | 10/2013 | Gupta | G06F 12/16 711/162 |
| 2014/0244949 A1 * | 8/2014 | Abali | G06F 3/065 711/162 |
| 2015/0095693 A1 | 4/2015 | Chinnakkonda Vidyapoornachary et al. | |

\* cited by examiner

SYSTEM AND METHOD FOR COMPUTER MEMORY WITH LINKED PATHS

BACKGROUND

The present disclosure relates to computer systems, and more specifically, to computer memory systems with linked paths.

Main memory in a system can be setup in various physical configurations to optimize power consumption and performance. Memory may be mirrored for redundancy to mitigate memory failures. Memory mirroring is a feature of some memory systems which provides for two copies of data to be stored in memory including a main copy and a backup copy. With traditional memory mirroring, two complete paths are necessary. Each path includes a memory controller connected to a memory buffer through a high speed memory channel and the memory buffer connected to a set of memory modules through DDR channels.

Some memory buffers contain two high speed memory channels. Sometimes the second high speed memory channel is used to cascade data to a second memory buffer on the same path. In other memory systems, a memory buffer contains a second high speed memory channel which is unused.

SUMMARY

According to embodiments of the present disclosure, a method for computer memory with linked paths is disclosed. The method includes disabling a first connection between a first memory buffer and a first memory controller. The first memory buffer has a first high speed memory channel and a second high speed memory channel. The first connection is connected to the first memory buffer through the first high speed memory channel. The method further includes enabling a second connection between a second memory buffer and the first memory buffer. The second memory buffer has a third high speed memory channel and a fourth high speed memory channel. The second connection is connecting the second high speed memory channel and the third high speed memory channel. The first memory buffer is connected to a first memory module set. The second memory buffer is connected to a second memory module set. The method further includes communicating a write command from a second memory controller to the second memory buffer. The second memory controller is connected to the second memory buffer through the fourth high speed memory channel. The method further includes communicating the write command from the second memory buffer to the first memory buffer and communicating the write command from the first memory buffer to the first memory module set.

According to embodiments of the present disclosure, a system for computer memory with linked paths is also disclosed. The system includes a first memory buffer. The first memory buffer has a first high speed memory channel and a second high speed memory channel. The system further includes a second memory buffer connected to the first memory buffer through a first connection. The second memory buffer has a third high speed memory channel and a fourth high speed memory channel. The first connection connects the first high speed memory channel and the third high speed memory channel. The system further includes a first memory controller connected to the first memory buffer through the second high speed memory channel. The system further includes a second memory controller connected to the second memory buffer through a second connection. The second connection is connected to the second memory buffer through the fourth high speed memory channel. The system further includes a first memory module set connected to the first memory buffer and a second memory module set connected to the second memory buffer. The first connection is disabled when the second connection is enabled and the second connection is disabled when the first connection is enabled.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
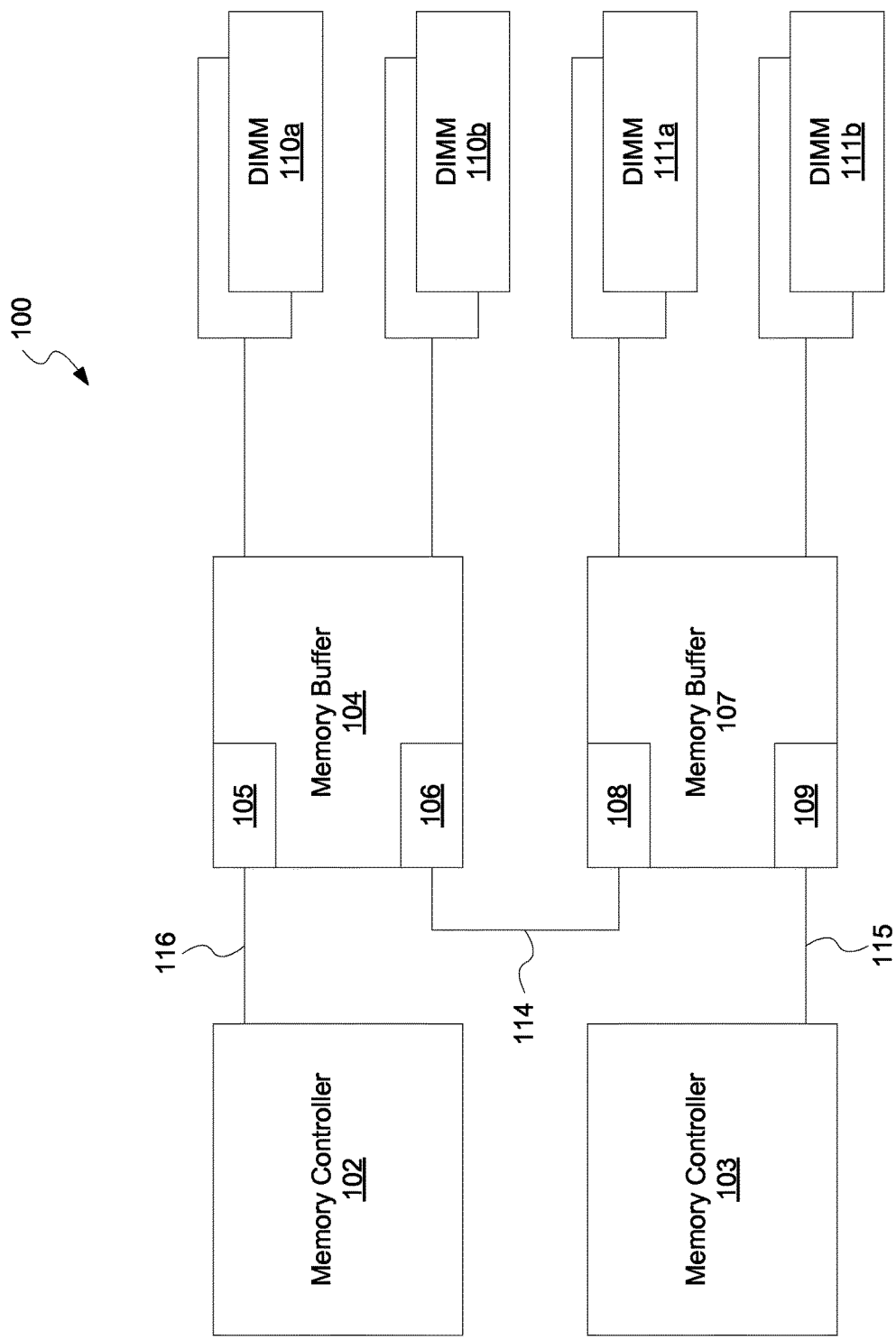
FIG. 1 depicts a block diagram of an example memory system with linked paths.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer memory systems, more particular aspects relate to computer memory systems with linked paths. While the present disclosure is not necessarily limited to such applications, various aspects of the disclosure may be appreciated through a discussion of various examples using this context.

Embodiments of the present invention provide for a memory system with paths linked through memory buffers. This may allow for a memory system which can switch between a setting where two memory paths are each controlled by a separate memory controller and a setting where one memory controller controls both paths. This may allow for memory mirroring using one memory controller. Two complete memory paths may be provided with each path containing a memory controller connected to a memory buffer through a high speed memory channel and the memory buffer connected to a set of memory modules. The memory buffers from each path may be connected to each other through a second high speed memory channel on each memory buffer. The connection between the memory buffers may be enabled or disabled based on the how the memory system is to be used. Additionally, a connection from a memory controller to a memory buffer may be enabled or disabled.

The connection between the memory buffers may remain disabled and the memory system may function normally with each memory channel being controlled by a separate memory controller. However, the connection between the memory buffers may be enabled and a connection to one of the memory controllers may be disabled so that one memory controller may control the memory module sets in both paths. This may allow for memory mirroring with reduced bandwidth as only one memory controller sends one set of data to a memory buffer instead of two memory controllers each sending the set of data. Additionally, power may be conserved by turning off the end to end memory path which is unused. This end to end path comprises the memory controller, high speed channel connecting the controller and buffer, and the logic of the high speed channel interface on the buffer. In some embodiments, one memory controller may control both memory module sets without performing memory mirroring. In some embodiments, the connection between either memory controller and its corresponding memory buffer may be disabled, with the connection enabled between the two memory buffers. This may allow the use of either memory controller to control both paths in the event one memory controller and/or the high speed channel to memory buffer is failing.

Referring to FIG. 1, a block diagram of an example memory system 100 with linked paths is depicted. A memory buffer 104 may be connected to a memory controller 102, by connection 116, through a high speed channel 105. Memory buffer 104 may also be connected to a set of memory modules 110a and 110b. A second memory buffer 107 may be connected, by connection 115, to a second memory controller 103 through high speed memory channel 109. Memory buffer 107 may also be connected to a set of memory modules 111a and 111b. Memory buffer 104 and memory buffer 107 may be connected, by connection 114, through high speed memory channels 106 and 108.

Connections 114 and 115 may be alternately enabled and disabled. When performing in normal mode, connection 114 may be disabled and connection 115 may be enabled. Memory controller 102 may communicate with memory buffer 104 to control memory modules 110a and 110b. Memory controller 103 may communicate with memory buffer 107 to control memory modules 111a and 111b. When performing in either mirroring mode or power save mode, connection 114 may be enabled and connection 115 may be disabled. Further, memory controller 103, high speed memory channel 109, and logic associated with high speed memory channel 109 may be turned off. In memory mirroring mode, memory controller 102 may communicate a write command to memory buffer 104 to write on memory module sets 110a and 110b, while memory buffer 104 communicates the write command to memory buffer 107 to write a duplicate copy on memory module sets 111a and 111b. In power save mode, memory controller 102 may control either set of memory modules. For example, memory controller 102 may send a write command for memory buffer 107 through memory buffer 104 to save data on memory module sets 111a and 111b.

In some embodiments, connection 116 may be may be disabled instead of connection 115 for mirroring mode or power save mode. This may allow the use of either memory controller to control both paths in the event one memory controller and/or the high speed channel to memory buffer is failing.

Figure 2:
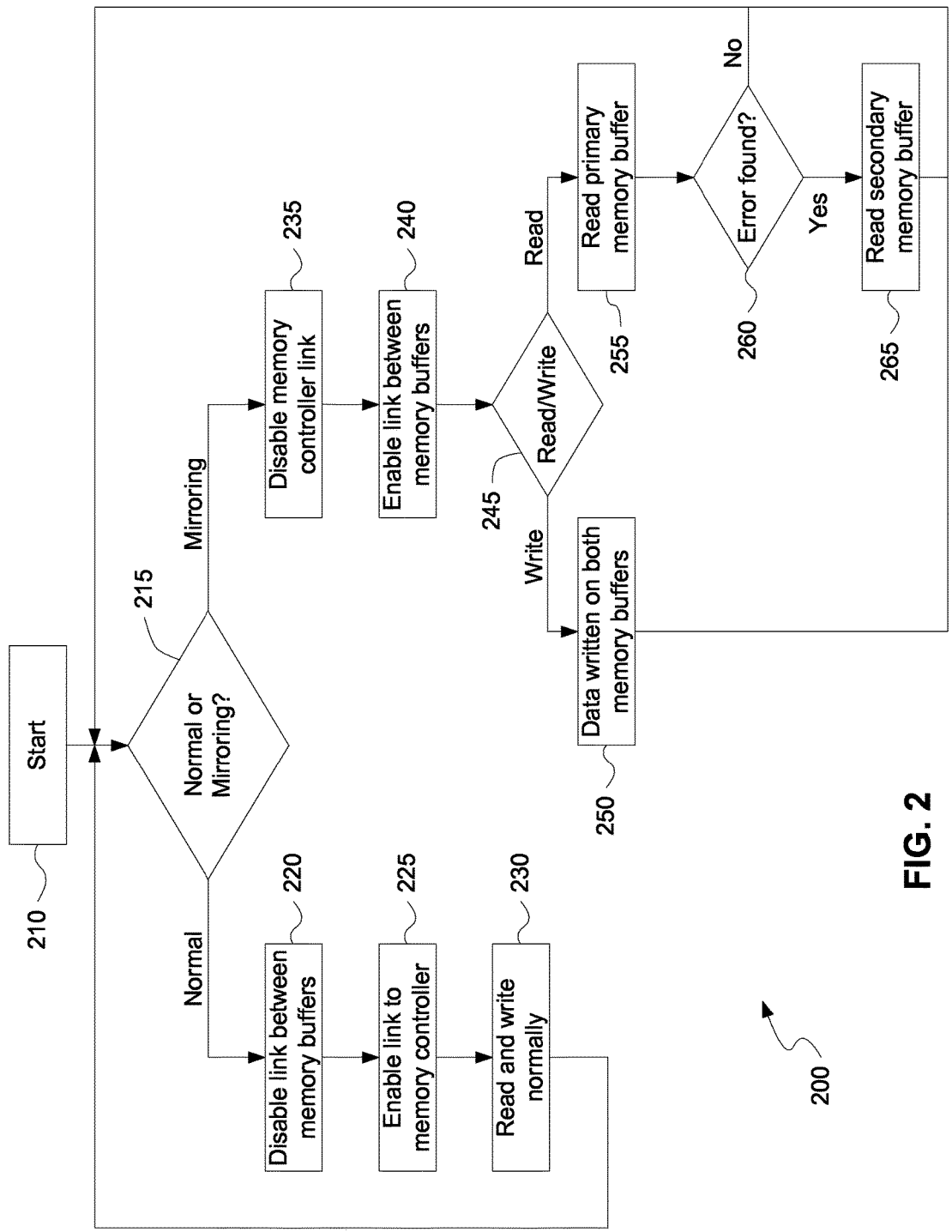
FIG. 2 depicts a flow diagram of an example method for using a memory system with linked paths.

Referring now to FIG. 2, a flow diagram of an example method 200 for using a memory system with linked paths is depicted. Method 200 may be used with a memory system such as memory system 100 depicted in FIG. 1 with memory buffers linked between two paths. Method 200 starts at block 210. At block 215, it may be determined if the memory system is in normal or mirroring mode. If the memory system is in normal mode, method 200 may proceed to block 220. At block 220, the connection between memory buffers may be disabled. At block 225, the memory controller to memory buffer connection which is disabled for mirroring mode may be enabled. At step 230, each memory controller may read and write normally on its own path.

At block 215, if the system is in mirroring mode, method 200 may proceed to step 235 and disable the connection from a memory controller to a memory buffer. Step 235 may also include turning off the unused memory controller, high speed memory channel and logic associated with the unused high speed memory channel. At step 240, the connection between the two memory buffers may be enabled. At step 245, it may be determined whether the memory controller, whose connection to a memory buffer is still enabled, is sending a read or a write command. If the memory controller is sending a write command, method 200 may proceed to block 250 and communicate the write command to both memory buffers for writing identical data on both the primary memory module set in its path and the secondary memory module set on the linked path. If the memory controller is sending a read command, method 200 may proceed to block 255 and read the data from the memory primary memory buffer connected to the primary memory module set. At block 260, it is determined whether there is an error in the data obtained from the primary memory module set. If an error is found, method 200 may proceed to block 265 and read the data from the secondary memory buffer connected to the secondary memory module set.

Figure 3:
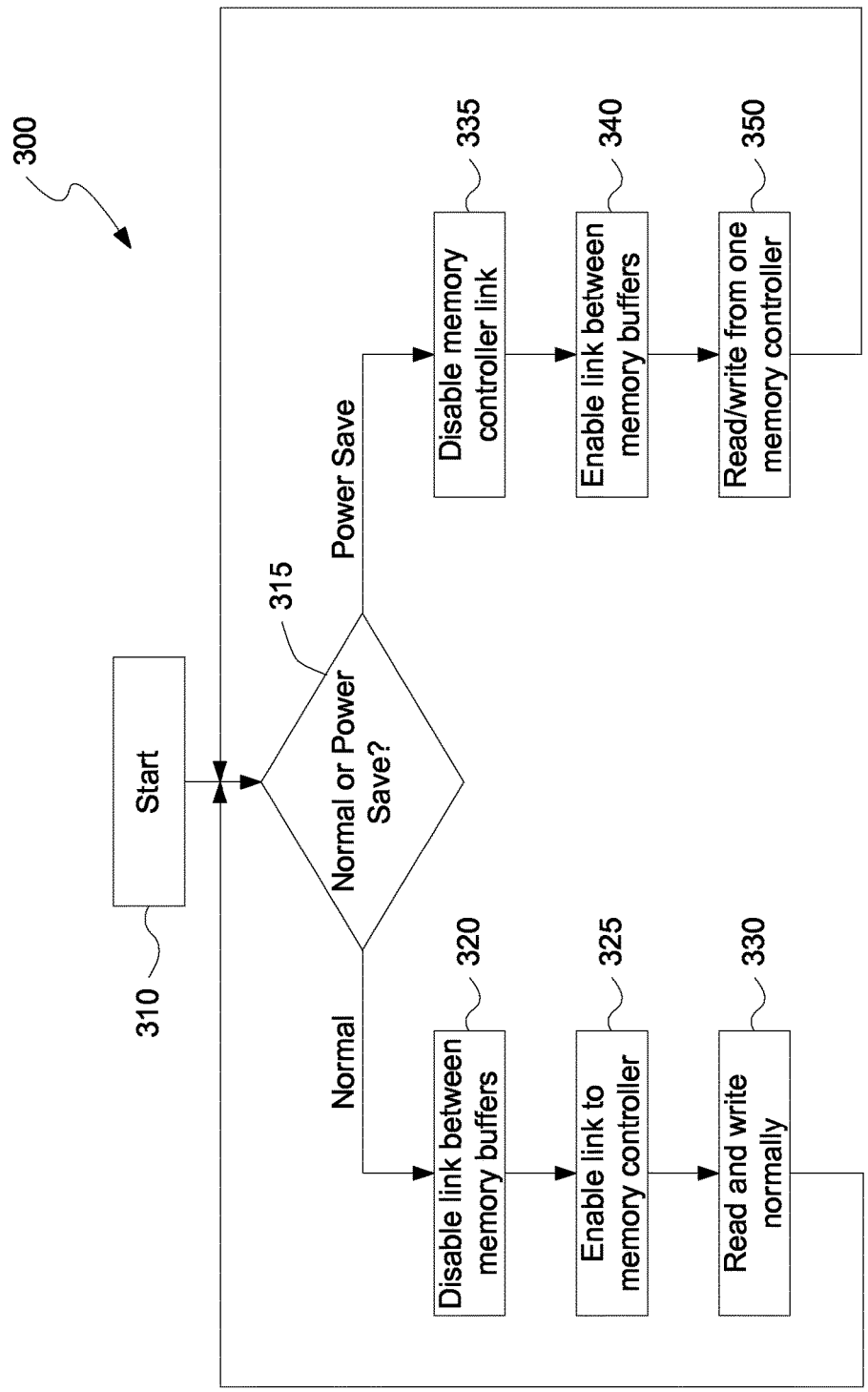
FIG. 3 depicts a flow diagram of a second example method for using a memory system with linked paths.

Referring now to FIG. 3, a flow diagram of a second example method 300 for using a memory system with linked paths is depicted. Method 300 starts at block 310. At block 315, it may be determined if the memory system is operating in normal mode or power save mode. If the memory system is in normal mode, method 300 may proceed to block 320. At block 320, the connection between memory buffers may be disabled. At block 325, the memory controller to memory buffer connection which is disabled for power save mode may be enabled. At step 330, each memory controller may read and write normally on its own path.

At block 315, if it is determined that the memory system is operating in power save mode, method 300 may proceed to block 335 and disable one of the connections between a memory controller and a memory buffer. Additionally, at block 335, the unused memory controller, high speed memory channel, and logic associated with the unused high speed memory channel may be turned off. At block 340, the connection between memory buffers may be enabled. At step 350, the memory controller which is still linked to a memory buffer may control both paths and send read and write commands to either memory buffer.

Figure 4:
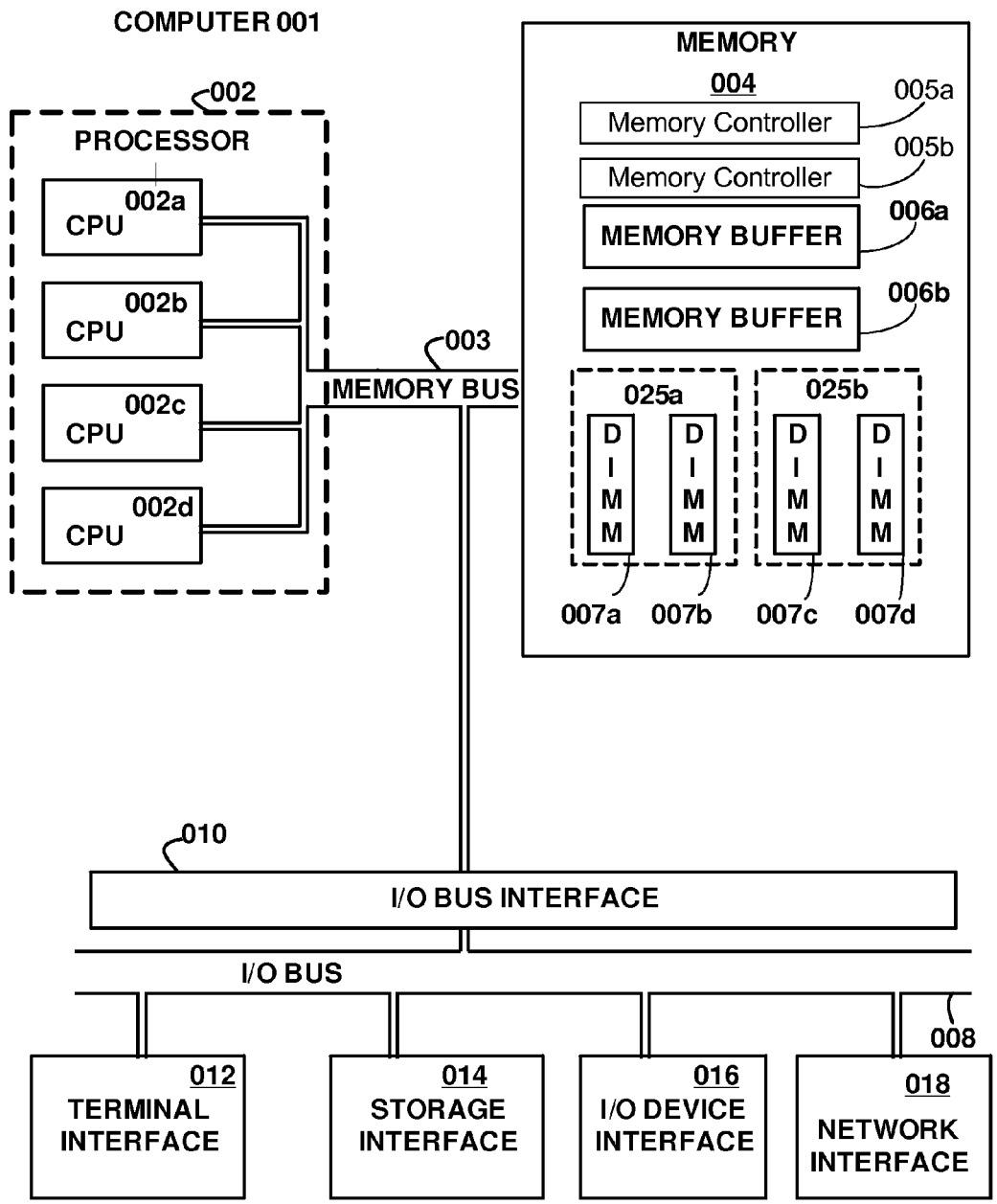
FIG. 4 depicts a high-level block diagram of an example system for implementing one or more embodiments of the invention.

FIG. 4 depicts a high-level block diagram of an example system for implementing one or more embodiments of the invention. The mechanisms and apparatus of embodiments of the present invention apply equally to any appropriate computing system. The major components of the computer system 001 comprise one or more CPUs 002, a memory subsystem 004, a terminal interface 012, a storage interface 014, an I/O (Input/Output) device interface 016, and a network interface 018, all of which are communicatively coupled, directly or indirectly, for inter-component communication via a memory bus 003, an I/O bus 008, and an I/O bus interface unit 010.

The computer system 001 may contain one or more general-purpose programmable central processing units (CPUs) 002A, 002B, 002C, and 002D, herein generically referred to as the CPU 002. In an embodiment, the computer system 001 may contain multiple processors typical of a relatively large system; however, in another embodiment the computer system 001 may alternatively be a single CPU system. Each CPU 002 executes instructions stored in the memory subsystem 004 and may comprise one or more levels of on-board cache.

In an embodiment, the memory subsystem 004 may comprise a random-access semiconductor memory, storage device, or storage medium (either volatile or non-volatile) for storing data and programs. In another embodiment, the memory subsystem 004 may represent the entire virtual memory of the computer system 001, and may also include the virtual memory of other computer systems coupled to the computer system 001 or connected via a network. The memory subsystem 004 may be conceptually a single monolithic entity, but in other embodiments the memory subsystem 004 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory or memory subsystem 004 may contain elements for control and flow of memory used by the CPU 002. This may include all or a portion of the following: two or more memory controllers 005, two or more memory buffers 006 and one or more memory modules 007. In the illustrated embodiment, the memory modules 007 may be dual in-line memory modules (DIMMs), which are a series of dynamic random-access memory (DRAM) chips mounted on a printed circuit board and designed for use in personal computers, workstations, and servers. In various embodiments, these elements may be connected with buses for communication of data and instructions. In other embodiments, these elements may be combined into single chips that perform multiple duties or integrated into various types of memory modules. The illustrated elements are shown as being contained within the memory subsystem 004 in the computer system 001. In other embodiments the components may be arranged differently and have a variety of configurations. For example, the memory controllers 005 may be on the CPU 002 side of the memory bus 003. In other embodiments, some or all of them may be on different computer systems and may be accessed remotely, e.g., via a network.

Although the memory bus 003 is shown in FIG. 4 as a single bus structure providing a direct communication path among the CPUs 002, the memory subsystem 004, and the I/O bus interface 010, the memory bus 003 may in fact comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 010 and the I/O bus 008 are shown as single respective units, the computer system 001 may, in fact, contain multiple I/O interface units 010, multiple I/O buses 008, or both. While multiple I/O interface units are shown, which separate the I/O bus 008 from various communications paths running to the various I/O devices, in other embodiments some or all of the I/O devices are connected directly to one or more system I/O buses.

In various embodiments, the computer system 001 is a multi-user mainframe computer system, a single-user system, or a server computer or similar device that has little or no direct user interface, but receives requests from other computer systems (clients). In other embodiments, the computer system 001 is implemented as a desktop computer, portable computer, laptop or notebook computer, tablet computer, pocket computer, telephone, smart phone, network switches or routers, or any other appropriate type of electronic device.

FIG. 4 is intended to depict the representative major components of an exemplary computer system 001. But individual components may have greater complexity than represented in FIG. 4, components other than or in addition to those shown in FIG. 4 may be present, and the number, type, and configuration of such components may vary. Several particular examples of such complexities or additional variations are disclosed herein. The particular examples disclosed are for example only and are not necessarily the only such variations.

The memory buffers 006, in this embodiment, may be intelligent memory buffers, each of which includes an exemplary type of logic module. Such logic modules may include hardware, firmware, or both for a variety of operations and tasks, examples of which include: data buffering, data splitting, and data routing. The logic module for memory buffers 006 may control the DIMMs 007, the data flow between the DIMMs 007 and memory buffers 006, and data flow with outside elements, such as the memory controllers 005. Outside elements, such as the memory controllers 005 may have their own logic modules that the logic modules of memory buffers 006 interact with. The logic modules may be used for failure detection and correcting techniques for failures that may occur in the DIMMs 007. Examples of such techniques include: Error Correcting Code (ECC), Built-In-Self-Test (BIST), extended exercisers, and scrub functions. The firmware or hardware may add additional sections of data for failure determination as the data is passed through the system. Logic modules throughout the system, including but not limited to the memory buffers 006, memory controllers 005, CPU 002, and even the DRAM may use these techniques in the same or different forms. These logic modules may communicate failures and changes to memory usage to a hypervisor or operating system. The hypervisor or the operating system may be a system that is used to map memory in the system 001 and tracks the location of data in memory systems used by the CPU 002. In embodiments that combine or rearrange elements, aspects of the firmware, hardware, or logic modules capabilities may be combined or redistributed. These variations would be apparent to one skilled in the art.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A memory system comprising:
a first memory buffer, the first memory buffer having a first high speed memory channel and a second high speed memory channel;
a second memory buffer connected directly to the first memory buffer through a first connection, the second memory buffer having a third high speed memory channel and a fourth high speed memory channel, the first connection connecting the first high speed memory channel and the third high speed memory channel;
a first memory controller connected directly to the first memory buffer through the second high speed memory channel;
a second memory controller connected directly to the second memory buffer through a second connection, the second connection connected to the second memory buffer through the fourth high speed memory channel;
a first memory module set connected to the first memory buffer; and
a second memory module set connected to the second memory buffer, wherein the first connection is disabled when the second connection is enabled and the second connection is disabled when the first connection is enabled.

2. The memory system of claim 1, wherein the second memory controller is configured to turn off when the second connection is disabled.

3. The memory system of claim 1, wherein the fourth high speed memory channel is configured to turn off when the second connection is disabled.

4. The memory system of claim 1, wherein logic associated with the fourth high speed memory channel is configured to turn off when the second connection is disabled.

5. The memory system of claim 1, wherein a write command communicated from the first memory controller to the first memory buffer is further communicated from the first memory buffer to the second memory buffer such that identical data is written on the first memory module set and the second memory module set when the second connection in enabled.

6. The memory system of claim 1, wherein the first memory controller is configured to communicate write commands to the second memory module set when the second connection is enabled.

7. The memory system of claim 1, wherein the memory system is configured to switch between operating in a normal mode and a mirroring mode, and wherein, in the normal mode, the first connection is disabled and the second connection is enabled, and wherein, in the normal mode reads and writes from the first memory controller are communicated to the first memory module set through the first memory buffer and reads and writes from the second memory controller are communicated to the second memory module set through the second memory buffer, and wherein, in the mirroring mode, the first connection is enabled and the second connection is disabled, and wherein, in the mirroring mode, writes from the first memory controller are communicated both to the first memory module set through the first memory buffer and to the second memory module set through the first memory buffer and the second memory buffer.

8. The memory system of claim 1, wherein the memory system is configured to switch between operating in a normal mode and a power save mode, and wherein, in the normal mode, the first connection is disabled and the second connection is enabled, and wherein, in the normal mode reads and writes from the first memory controller are communicated to the first memory module set through the first memory buffer and reads and writes from the second memory controller are communicated to the second memory module set through the second memory buffer, and wherein, in the power save mode, the first connection is enabled and the second connection is disabled, and wherein, in the power save mode, the first memory controller communicates separate writes to both the first memory module set and the second memory module set.

* * * * *